United States Patent
Jia et al.

(10) Patent No.: US 12,228,783 B1
(45) Date of Patent: Feb. 18, 2025

(54) ROBOTIC SYSTEM OBSTACLE RECOGNITION

(71) Applicant: Meta Platforms, Inc., Menlo Park, CA (US)

(72) Inventors: Xinghua Jia, Bellmore, NY (US); Jonathan M. Kuriloff, Hauppauge, NY (US); John L. Jayne, Hauppauge, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 794 days.

(21) Appl. No.: 17/363,261

(22) Filed: Jun. 30, 2021

Related U.S. Application Data

(60) Provisional application No. 63/048,787, filed on Jul. 7, 2020, provisional application No. 63/048,793, filed on Jul. 7, 2020.

(51) Int. Cl.
| | | |
|---|---|---|
| *G02B 6/48* | (2006.01) | |
| *B25J 9/16* | (2006.01) | |
| *G06T 7/521* | (2017.01) | |
| *G06T 7/593* | (2017.01) | |
| *G06T 7/70* | (2017.01) | |
| *G06V 20/10* | (2022.01) | |
| *H02G 1/04* | (2006.01) | |
| *H02G 7/02* | (2006.01) | |
| *H04N 13/239* | (2018.01) | |
| *H04N 13/00* | (2018.01) | |

(52) U.S. Cl.
CPC .............. *G02B 6/48* (2013.01); *B25J 9/1666* (2013.01); *G06T 7/521* (2017.01); *G06T 7/593* (2017.01); *G06T 7/70* (2017.01); *G06V 20/10* (2022.01); *H02G 1/04* (2013.01); *H02G 7/02* (2013.01); *H04N 13/239* (2018.05); *G06T 2207/10048* (2013.01); *H04N 2013/0081* (2013.01)

(58) Field of Classification Search
CPC .. H02G 1/02; H02G 1/04; H02G 7/00; H02G 7/02; G02B 6/48–486
See application file for complete search history.

(56) References Cited

U.S. PATENT DOCUMENTS

| | | | | |
|---|---|---|---|---|
| 4,715,582 A | * | 12/1987 | Ikeda ...................... | H02G 1/02 254/134.3 CL |
| 6,032,448 A | * | 3/2000 | Baker ................... | G02B 6/4422 57/18 |

(Continued)

*Primary Examiner* — Tyrone V Hall, Jr.
(74) *Attorney, Agent, or Firm* — Greenberg Traurig, LLP

(57) ABSTRACT

The disclosed systems for suspending cable (e.g., fiber optic cable) from an overhead powerline may include a payload subsystem for housing and dispensing a cable along an overhead powerline, a rotation subsystem for winging the cable from the payload subsystem around the powerline, an extension subsystem for moving the payload subsystem to avoid obstacles, an obstacle detection subsystem for automatically detecting obstacles encountered along the powerline, a drive subsystem for driving the system along the powerline, and at least one processor for controlling the payload subsystem, rotation subsystem, extension subsystem, obstacle detection subsystem, and drive subsystem in a manner that avoids obstacles as the system moves along the powerline. Various other related systems, devices, components, and methods are also disclosed.

12 Claims, 13 Drawing Sheets

(56) References Cited

U.S. PATENT DOCUMENTS

| | | | | |
|---|---|---|---|---|
| 6,032,449 | A * | 3/2000 | Einsle | G02B 6/483 57/18 |
| 7,552,684 | B2 * | 6/2009 | Montambault | B61B 7/06 104/173.1 |
| 9,540,179 | B2 * | 1/2017 | Yang | B65G 25/04 |
| 11,173,595 | B2 * | 11/2021 | Xu | B25J 9/0009 |
| 2020/0358268 | A1 | 11/2020 | Kuriloff et al. | |

* cited by examiner

ROBOTIC SYSTEM OBSTACLE RECOGNITION

CROSS-REFERENCE TO RELATED APPLICATIONS

This application claims the benefit of U.S. Provisional Patent Application No. 63/048,793, titled "STABILIZATION OF A ROBOTIC SYSTEM IN AN UNSTABLE EQUILIBRIUM CONFIGURATION," filed on 7 Jul. 2020, and also claims the benefit of U.S. Provisional Patent Application No. 63/048,787, titled "ROBOTIC SYSTEM OBSTACLE RECOGNITION," filed 7 Jul. 2020, the entire disclosure of each of which is incorporated herein by this reference.

BRIEF DESCRIPTION OF DRAWINGS

The accompanying drawings illustrate a number of example embodiments and are a part of the specification. Together with the following description, these drawings demonstrate and explain various principles of the present disclosure.

Figure 1:
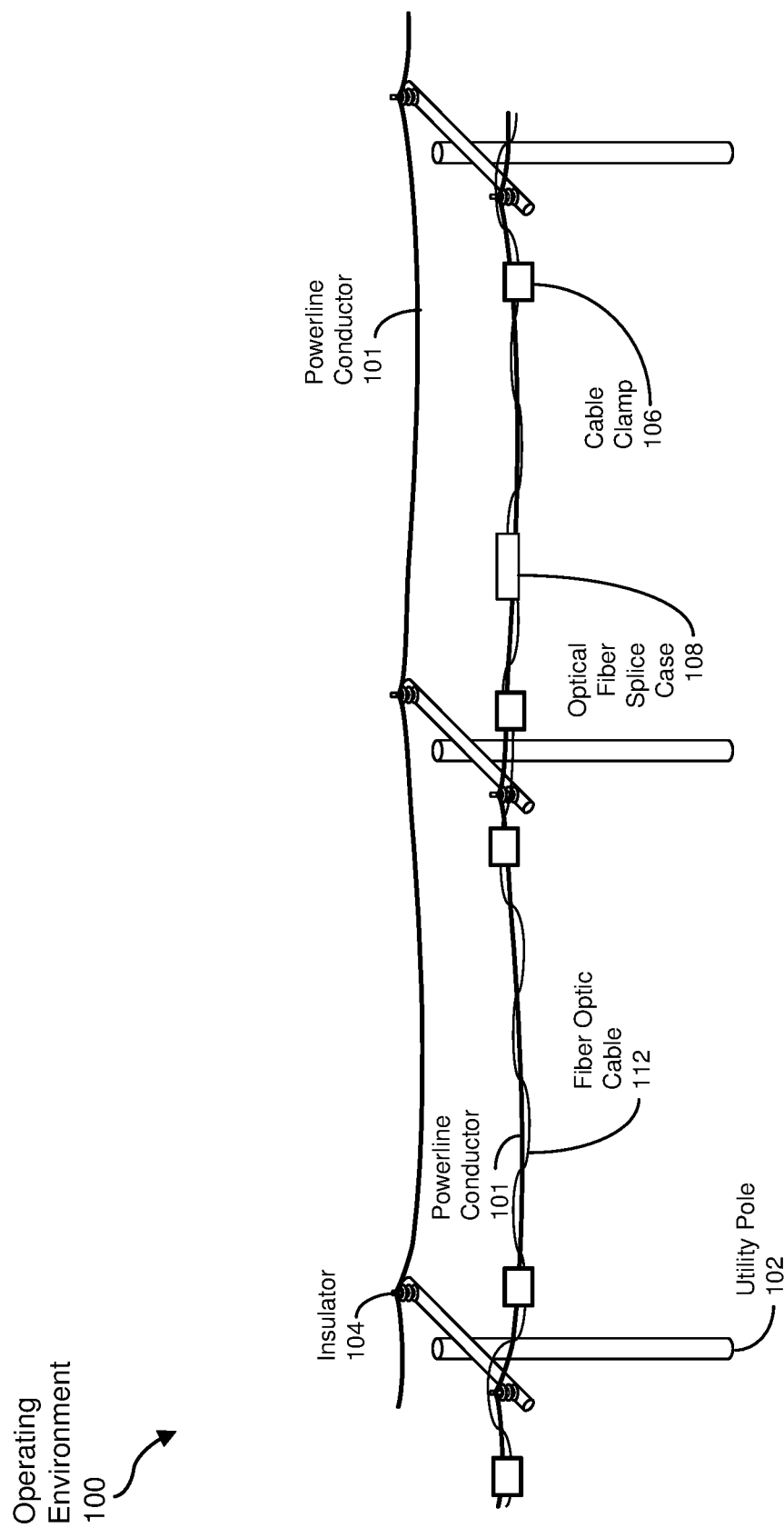
FIG. 1 is a graphical representation of an example operating environment, including a powerline, in which various example embodiments may be employed, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Robotic devices may be employed to install fiber optic cable onto preexisting power infrastructure, such as powerline conductors for electrical power transmission and distribution lines, by way of helically wrapping the fiber optic cable about the powerline conductor. Such an installation may benefit from the use of the preexisting right-of-way and corresponding infrastructure (e.g., power conductors, electrical towers or poles, and so on) associated with the electrical power distribution system. Such a robotic device may include, in some examples, a drive subsystem that causes the robotic device to travel along the powerline conductor (e.g., between towers or poles) while a rotation subsystem of the device helically wraps the fiber optic cable about the conductor.

While translating along a powerline conductor during fiber optic cable installation, conventional robotic devices may encounter one or more obstacles (e.g., insulators, taps, and the like), especially along powerline conductors of electrical distribution systems. In such cases, human operators may intervene to temporarily remove and then reattach the robotic device to allow the robotic device to continue to install the fiber optic cable on the powerline conductor beyond the encountered obstacle.

The present disclosure is generally directed to robotic systems and associated methods for installing fiber optic cable on a powerline conductor. As will be explained in greater detail below, embodiments of the present disclosure may facilitate detection and/or recognition of obstacles (e.g., along the powerline conductor) by the robotic system to allow the system to negotiate, bypass, and/or otherwise avoid at least some of those obstacles, thus potentially reducing the amount of human intervention required to allow the robotic device to install the fiber optic cable. Consequently, for this reason and others described below, fiber "make ready" costs (e.g., costs incurred in preparing a utility powerline conductor for installation of fiber optic cable and subsequently installing the fiber optic cable) may be significantly reduced.

Features from any of the embodiments described herein may be used in combination with one another in accordance with the general principles described herein. These and other embodiments, features, and advantages will be more fully understood upon reading the following detailed description in conjunction with the accompanying drawings.

The following will provide, with reference to FIGS. 1-13, detailed descriptions of robotic systems and methods for recognizing an obstacle along a powerline conductor while installing fiber optic cable on that conductor. A brief description of an example operating environment in which various embodiments of systems and methods for installing fiber optic cable may operate is provided in connection with FIG. 1. Example robotic systems for installing fiber optic cable are discussed in conjunction with FIGS. 2-9. In association with FIG. 10, an example method of obstacle recognition/detection by the robotic system is described. An example method of obstacle avoidance is described in connection with FIG. 11. An example robotic system employing the obstacle recognition method is discussed in connection with FIG. 12. Referring to FIG. 13, the following will provide a detailed description of another example method of obstacle avoidance.

FIG. 1 is a graphical representation of an example operating environment 100 in which various embodiments disclosed herein may be utilized. As depicted in the example of FIG. 1, the operating environment 100 may include an electrical power transmission or distribution system having a plurality of utility poles 102 carrying multiple powerlines 101. Examples of powerlines 101 may include stranded cables, but the powerlines 101 are not restricted to such embodiments. While any number of powerlines 101 may be carried via the utility poles 102, two powerlines 101 are illustrated in FIG. 1 for visual simplicity. In some examples, the powerlines 101 are mechanically coupled to the utility poles 102 via insulators 104, although other types of components (e.g., taps, standoffs, etc.) may be employed in various embodiments. While specific reference is made herein to the utility poles 102, any type of utility pole, H-frame, lattice tower, or other type of pole or tower that carries or supports one or more powerlines 101 may be included and covered in various embodiments of the operating environment 100 discussed herein. Additionally, the powerlines 101 may include one or more phase conductors, ground wires, static wires, or other conductors supported by the utility poles 102, towers, or the like.

Also shown in FIG. 1 is a fiber optic cable 112 aligned with, and mechanically coupled to, the powerline 101. In some embodiments, the fiber optic cable 112 may be helically wrapped about the powerline 101, such as by way of a human-powered or electrically powered robotic device. However, other physical relationships between the powerline 101 and the fiber optic cable 112 are also possible. While only one fiber optic cable 112 is depicted in FIG. 1, multiple powerlines 101 employing the same utility poles 102 may each have a corresponding fiber optic cable 112 or multiple fiber optic cables 112 attached or otherwise coupled thereto.

As depicted in FIG. 1, the fiber optic cable 112 may be secured to the powerline 101 via one or more cable clamps 106. In some examples, the fiber optic cable 112 may follow a powerline 101 associated with a particular phase of the power being transmitted, or the fiber optic cable 112 may alternate between two or three different phases. Moreover, each fiber optic cable 112 may carry one or more optical fibers for facilitating communication within and across the operating environment 100.

Additionally, FIG. 1 illustrates an optical fiber splice case 108 that, in some embodiments, splices together corresponding ends of optical fibers of the fiber optic cable 112. For example, relatively long stretches (e.g., multiple-kilometer spans) of fiber optic cable 112 that may be coupled to the powerline 101 may be mechanically coupled together, thermally fused together, or otherwise coupled in the optical fiber splice case 108, which may include optical couplers, amplifiers, and/or other components to facilitate transmission of optical data signals from one span of the fiber optic cable 112 to the next.

Additionally, in some embodiments, the optical fiber splice case 108 may include wireless access points and other networking components (e.g., for communication with Internet of Things (IoT) devices, smart grid sensors (e.g., voltage sensors, current sensors, and the like), and user access networks). Moreover, the optical fiber splice case 108 may include optical, electromagnetic, and other types of sensors to measure powerline conditions; environmental sensors for measuring temperature, humidity, and so on; video cameras for surveillance; and the like. To power such components, the optical fiber splice case 108 may also include solar cells and/or batteries. In some examples, such as that shown in FIG. 1, the optical fiber splice case 108 may be attached to, or positioned on or near, the powerline 101, as opposed to being mounted on a lower portion of the utility pole 102, thus potentially eliminating the use of a phase-to-ground transition that otherwise may be coupled with each length of the fiber optic cable 112 to provide electrical isolation from the powerline 101.

Figure 2:
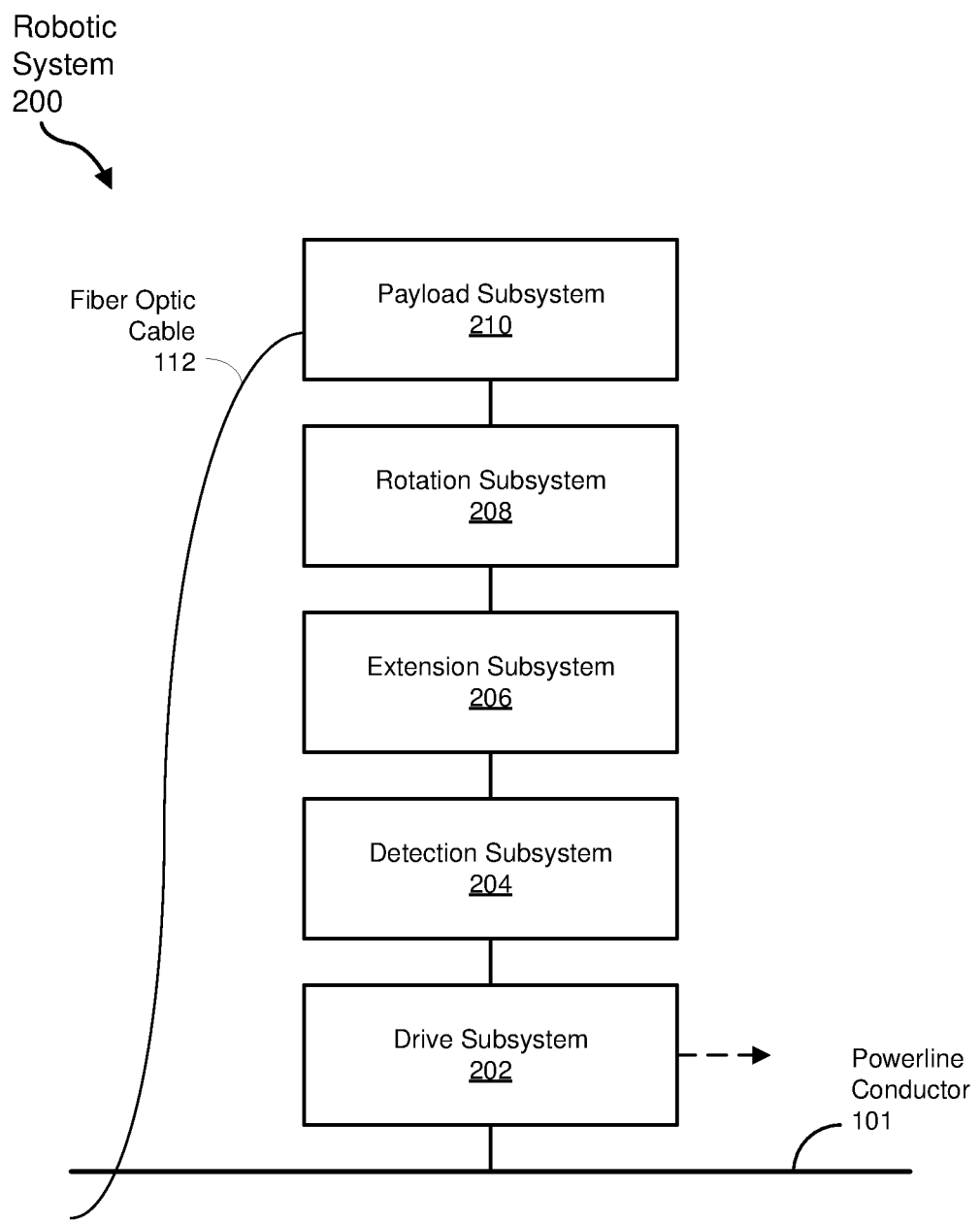
FIG. 2 is a block diagram of an example robotic system for installing fiber optic cable along a powerline, according to at least one embodiment of the present disclosure.

FIG. 2 is a block diagram of an example robotic system 200 for installing fiber optic cable (e.g., the fiber optic cable 112) along an overhead powerline (e.g., the powerline 101). As depicted in FIG. 2, the robotic system 200 may include a drive subsystem 202, a detection subsystem 204, an extension subsystem 206, a rotation subsystem 208, and/or a payload subsystem 210. In some embodiments, FIG. 2 provides a general representation of how the subsystems 202-210 are mechanically coupled to each other, although other examples may possess alternative connection arrangements.

In some embodiments, the drive subsystem 202 may translate the robotic system 200 along the powerline 101. Also, in some examples, the extension subsystem 206 may mechanically couple the rotation subsystem 208 to the drive subsystem 202 and selectively extend the rotation subsystem 208, along with the payload subsystem 210, away from the drive subsystem 202 and/or the powerline 101 to avoid obstacles (e.g., insulators 104) along the powerline 101. The rotation subsystem 208, in some examples, may rotate the payload subsystem 210, which may in turn carry a segment of the fiber optic cable 112, about the powerline 101 while the drive subsystem 202 translates along the powerline 101 such that the segment of the fiber optic cable 112 is helically wrapped about the powerline 101.

The detection subsystem 204 may be configured to detect obstacles (e.g., insulator supports, tap clamps, splices, dampers, support poles, bird diverters, Stockbridge dampers, spiral vibration dampers, tie wraps, splices, and the like) along the powerline 101 that the robotic system 200 should avoid. The detection subsystem 204 may include detection components, such as one or more cameras (e.g., stereoscopic cameras, two-dimensional (2D) cameras, infrared cameras, etc.), one or more light emitters (e.g., visible light emitters, infrared light emitters, laser light emitters, etc.), one or more sound (e.g., Sonar, ultrasonic, etc.) detectors, one or more sound (e.g., Sonar, ultrasonic, etc.) emitters, one or more LiDAR emitters and/or detectors, one or more Radar emitters and/or detectors, at least one processor for analyzing data from the other detection components, etc. These detection components may be positioned and oriented to obtain data representative of the powerline and/or obstacles along the powerline, including position data, size and shape data, etc.

In some embodiments, the detection subsystem 204 may be configured to sense and determine the obstacle type and position to facilitate avoidance of the obstacle. For example, a processor of the detection subsystem 204 may be programmed to determine the obstacle type (e.g., whether the obstacle is an insulator support, tap clamp, splice, damper, support pole, bird diverter, Stockbridge damper, spiral vibration damper, tie wrap, or splice), an obstacle position (e.g., below the powerline, above the powerline, to the side of the powerline, wrapped around the powerline, etc.), and/or obstacle size to determine the appropriate obstacle avoidance maneuver and whether an obstacle avoidance maneuver is necessary. To this end, the detection subsystem 204 may be programmed with information about different expected obstacle types, sizes, and positions and may use computer vision recognition to identify such information about the obstacles.

The robotic system 200 may include one or more stabilization components (e.g., one or more thrusters, gyroscopes, inertial measurement units (IMUs), controllers, processors, or the like) that may help attain or maintain a desired position of the robotic system 200 relative to the powerline 101. The desired position may be directly above the powerline 101 (e.g., with a center of gravity of the robotic system 200 directly above the powerline 101). Further, in some examples, the stabilization components may be employed at least during times when the extension subsystem 206 is extending the rotation subsystem 208 (and, consequently, the payload subsystem 210) away from (e.g., vertically above) the powerline 101, such as to avoid an obstacle.

Figure 3:
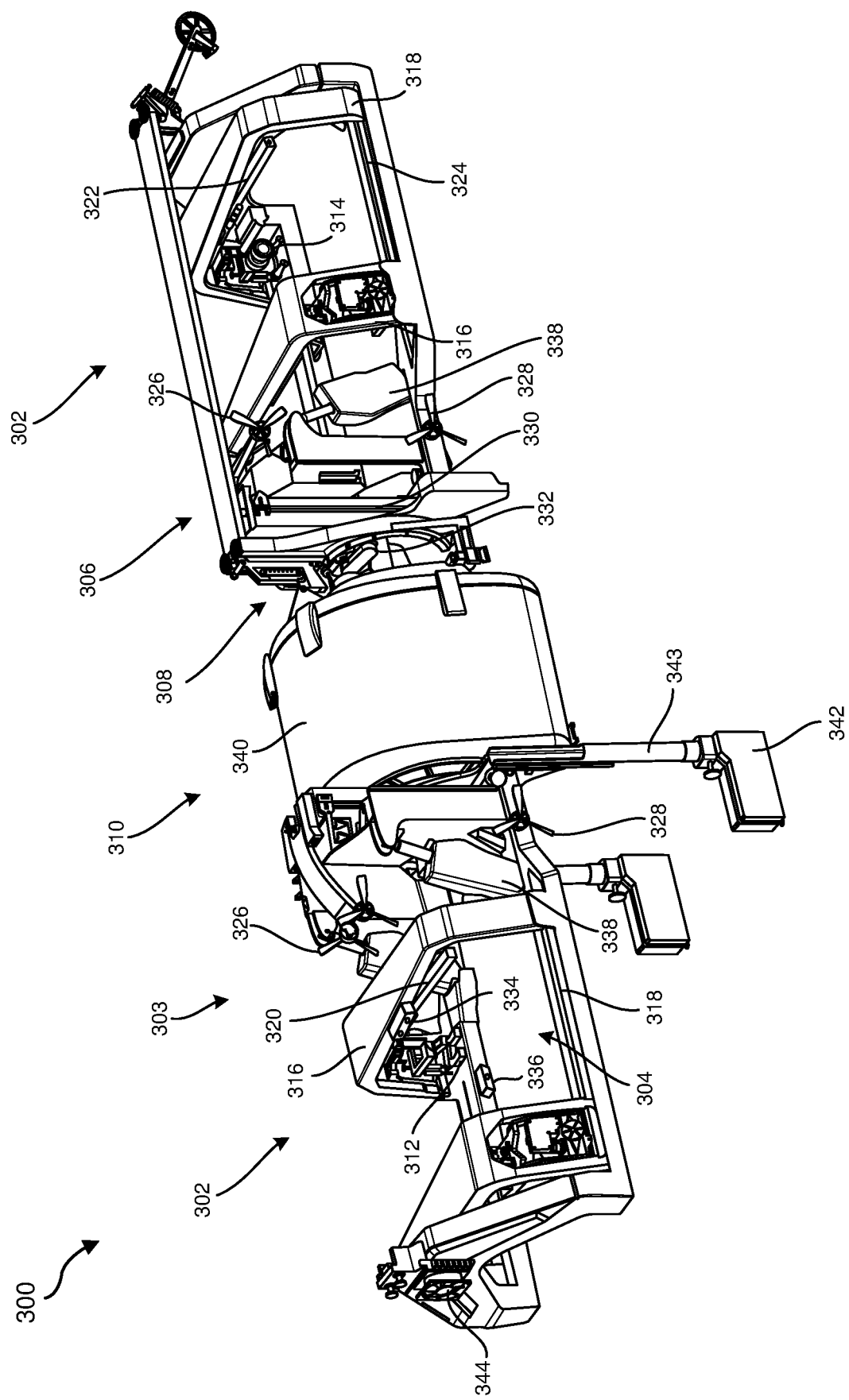
FIG. 3 is a perspective view of an example robotic system for installing fiber optic cable along a powerline, according to at least one embodiment of the present disclosure.

FIG. 3 is a perspective view of an example robotic system 300 for installing fiber optic cable along a powerline. The robotic system 300 may include a drive subsystem 302, a stabilization subsystem 303, an obstacle detection subsystem 304, an extension subsystem 306, a rotation subsystem 308, and a payload subsystem 310.

The drive subsystem 302 may be configured to drive the robotic system 300 along a powerline (e.g., the powerline 101) as the rotation subsystem 308 rotates the payload subsystem 310 to deploy a fiber optic cable (e.g., fiber optic cable 112) along and around the powerline. The drive subsystem 302 may be implemented in a variety of ways. For example, the drive subsystem 302 may include one or more rollers, grippers, actuators, conveyers, pulleys, etc., that may be arranged and operated to move the robotic system 300 along the powerline. In the example shown in FIG. 3, the drive subsystem 302 may include grippers 312 and rollers 314 that are configured to clamp onto the powerline and to drive the robotic system 300 along the powerline. The rollers 314 may be powered and/or unpowered. The grippers 312 may be mounted on a gripper frame element 316, and the rollers 314 may be mounted on a roller frame element 318.

The grippers 312 may be laterally (e.g., perpendicular to the powerline) movable along a gripper rail 320 affixed to the gripper frame element 316. The rollers 314 may be laterally movable along a roller rail 322 affixed to the roller frame element 318. The roller frame element 318, and consequently the roller rail 322 and the rollers 314, may be axially (e.g., parallel to the powerline) movable along a frame rail 322 relative to other portions of the robotic system 300. The drive subsystem 302 may include one or more grippers 312 and/or rollers 314 in a first end portion (e.g., to the left in the perspective of FIG. 3) of the robotic system 300 and one or more grippers 312 and/or rollers 314 in a second, opposite end portion (e.g., to the right in the perspective of FIG. 3) of the robotic system 300.

During operation, the grippers 312 may grip the powerline to stabilize the robotic system, such as during an obstacle avoidance maneuver. To engage with the powerline, the grippers 312 may be moved from a retracted (e.g., outward) position inward toward the powerline along the gripper rail 320. To drive the robotic system 300 along the powerline, at least one of the rollers 314 may be engaged with the powerline and may be caused to rotate. The rollers 314 may be translated axially along the frame rail 324 during an obstacle avoidance maneuver to keep the rollers 314 in contact with the powerline for stability, as will be explained further below with reference to FIGS. 6-9. The rollers 314 may also be disengaged and moved laterally outward to avoid obstacles. After the obstacle is passed by the rollers 314, the rollers 314 may then be moved back into position to engage with the powerline for continued driving of the robotic system 300 along the powerline.

The stabilization subsystem 303 may be configured to stabilize the robotic system 300 along the powerline as the robotic system 300 is driven along the powerline and/or during an obstacle avoidance maneuver. The stabilization subsystem 303 may be implemented in a variety of ways. For example, the stabilization subsystem 303 may include upper actuators 326 (e.g., thruster, fans, gyroscopes, etc.) that are positioned to be above the powerline, at least during certain obstacle avoidance maneuvers. As shown in FIG. 3, the stabilization subsystem 303 may include four upper actuators 326, although other embodiments may include a different number of upper actuators 326. The upper actuators 326 may be configured to force air laterally away from the robotic system 300, resulting in an opposing force against a frame of the robotic system 300. The upper actuators 326 may be configured to be selectively driven (e.g., activated, deactivated, driven at different speeds, etc.) to stabilize a rolling of the robotic system 300, such as about the powerline.

The robotic system 300 may, at least during some operations (e.g., during an obstacle avoidance maneuver), have a center of gravity that is vertically above the powerline. This may cause the robotic system 300 to be unstable when the robotic system 300 is supported by the powerline. For example, if the center of gravity of the robotic system 300 deviates to a side (e.g., due to wind or operational movements) and the center of gravity is not directly above the powerline, the robotic system 300 may tend to roll about the powerline. The stabilization subsystem 303 may be configured to counteract such rolling instabilities.

The upper actuators 326 may be positioned away from the powerline to be able to apply a rotational force to the robotic system 300. For example, the upper actuators 326 may be above the center of gravity of the robotic system 300 during an obstacle avoicance maneuver. Thus, as the center of gravity moves out of alignment with the powerline and the robotic system 300 begins to roll, the upper actuators 326 may be driven to force air in the direction of the rolling motion to force the robotic system back into a stable position with the center of gravity directly above the powerline. In some examples, at least some of the upper actuators 326 may be mounted to a portion of the frame that may be extended (e.g., raised) by the extension subsystem 308. Thus, as the extension subsystem 308 is activated to raise a portion of the robotic system 300 (e.g., the payload subsystem 310), such as to avoid an obstacle, at least some of the upper actuators 326 may also be raised. This may enable the upper actuators 326 to apply a greater torque to the robotic system 300 corresponding to a greater instability that may occur when a center of gravity of the robotic system 300 is increasingly higher than the powerline. In additional examples, at least some of the upper actuators 326 may be positioned on the frame to be above the powerline, but may be mounted to a fixed section of the frame (e.g., a portion of the frame that is not raised by the extension subsystem 308).

The upper actuators 326 may also be configured to roll the robotic system 300 about the powerline to reposition the robotic system 300 relative to the powerline. For example, during normal operation in which a fiber optic cable is deployed along the powerline, the robotic system 300 may be inverted compared to the orientation shown in FIG. 3 to translate along the powerline in a stable position (e.g., with a center of gravity below the powerline). When an obstacle to be avoided, such as an insulator supporting the powerline from below, is detected along a bottom of the powerline, the upper actuators 326 may be operated to rotate the robotic system 300 about the powerline to attain the orientation shown in FIG. 3. In this orientation, the center of gravity of the robotic system 300 may be above the powerline and may therefore be in an unstable position. The upper actuators 326 may be operated to maintain the robotic system 300 in this unstable position throughout an obstacle avoidance maneuver.

In some embodiments, the stabilization subsystem 303 may also include lower actuators 328 (e.g., thrusters, fans, gyroscopes, etc.). The lower actuators 328 may be positioned on the frame of the robotic system 300 to be closer to the powerline than the upper actuators 326. The lower actuators 328 may be positioned and configured to be selectively driven to stabilize a sway of the robotic system 300. For example, due to the flexibility of the powerline, the robotic system 300 and the powerline may tend to laterally sway, such as in response to wind or operational movements of the robotic system 300. The lower actuators 328 may be configured to counteract the swaying by forcing air in a direction of the sway, resulting in a force that pushes back against the swaying motion.

As noted above, the robotic system 300 may be normally operated in an inverted orientation compared to the orientation shown in FIG. 3. In some examples, the lower actuators 328 may also be actuated to assist in rotating the robotic system 300 about the powerline to position the robotic system 300 in the pose (e.g., orientation) shown in FIG. 3.

The obstacle detection subsystem 304 may be configured to detect obstacles that the robotic system 300 may encounter as the robotic system 300 is driven along the powerline by the drive subsystem 302. The obstacle detection subsystem 304 may be implemented in a variety of ways. For example, the obstacle detection subsystem 304 may include at least one camera (e.g., a stereoscopic camera, a 2D camera, an infrared camera, a combination thereof, etc.), an ultrasound emitter and receiver, or the like. In the example shown in FIG. 3, the detection subsystem 304 includes a stereoscopic infrared camera 334 and a 2D camera 336 positioned on a frame of the robotic system 300 at an end portion (e.g., a front end portion) thereof. The stereoscopic infrared camera 334 may include an infrared emitter and two distinct infrared image capture devices. The infrared capture devices may be configured to capture two perspectives of infrared light emitted by the infrared emitter and reflected from obstacles along the powerline. The 2D camera 336 may be may include a single image capture device and may be configured to capture visible light images of obstacles.

Data from both of the stereoscopic infrared camera 334 and the 2D camera 336 may be analyzed by at least one processor to determine the location of obstacles along the powerline at various times. For example, the stereoscopic infrared camera 334 may be used to determine a distance of an obstacle from the stereoscopic infrared camera 334 and the 2D camera 336 may be used to verify the distance and/or to determine the distance as the obstacle moves out of a field of view of the stereoscopic infrared camera 334. In some embodiments, the processor may also be configured to analyze data from the cameras 334, 336 to identify the powerline.

The stereoscopic infrared camera 334 and the 2D camera 336 may be positioned at a variety of locations on the robotic system 300. An appropriate location may be selected to enable the cameras 334, 336 to have a field of view that covers expected positions of obstacles along the powerline. By way of example and not limitation, the cameras 334, 336 may be positioned on a frame of the robotic system 300. For example, the stereoscopic infrared camera 334 and/or the 2D camera 336 may be mounted on the gripper frame element 316, on the roller frame element 318, and/or on another location on the frame of the robotic system 300. As shown in FIG. 3, in some examples the stereoscopic infrared camera 334 may be positioned centrally on the gripper frame element 316 above the powerline to capture images of the powerline along its axis. The 2D camera 336 may be positioned on the frame to capture images of the powerline from a lateral side of the powerline.

In some embodiments, the drive subsystem 302 may include a motion subsystem configured to sense a distance that the robotic system 300 is driven along the powerline by the drive subsystem 302. An obstacle's location may be known by the obstacle detection subsystem 304 at one time, but the obstacle may go out of the field of view of the obstacle detection subsystem 304 as the robotic system 300 moves along the powerline. For example, the obstacle may be obscured by a component of the robotic system 300 or may otherwise not be directly trackable. By sensing a distance that the robotic system 300 has travelled along the powerline after the location of the obstacle is last known, a distance between the obstacle and a component of the robotic system 300 may be estimated, even if the obstacle is not in view during the travel. For example, an encoder may determine how far along the powerline the robotic system 300 has traveled, such as by determining rotations of a roller and/or of another drive actuator. In additional examples, the position and movement of the robotic system 300 along the powerline may be determined in other ways, such as by using information from an IMU, from a global positioning system (GPS) receiver, from a simultaneous localization and mapping (SLAM) system, etc.

The extension subsystem 306 may be configured to move at least the payload subsystem 310 to avoid obstacles. The extension subsystem 306 may be implemented in a variety of ways. For example, the extension subsystem 306 may include extension rails 330 along which the payload 310 may be extended (e.g., raised or lowered, depending on the pose of the robotic system 300). An extension actuator 332 (e.g., a servo motor, a piston, etc.) may be used to extend the payload subsystem 310 along the extension rails 330.

In some embodiments, end portions of the robotic system 300 may be rotatable downward to facilitate obstacle avoidance, as will be explained in more detail below with reference to FIGS. 6-9. The extension subsystem 306 may also include end rotation actuators 338 (e.g., linear actuators, servo motors, rotational motors, etc.) configured to rotate the ends of the robotic system 300 downward.

The rotation subsystem 308 may be configured to rotate the payload subsystem 310 to enable the payload subsystem 310 to wrap fiber optic cable around the powerline as the robotic system 300 progresses along the powerline. The rotation subsystem 308 may be implemented in a variety of ways. For example, the rotation subsystem 308 may include a rotation actuator (e.g., a motor, a gear, pulleys, belts, etc.) that is operatively coupled to the payload subsystem 310.

The payload subsystem 310 may be configured to house fiber optic cable for deployment along the powerline. The payload subsystem 310 may be implemented in a variety of ways. For example, the payload subsystem 310 may include a spool of fiber optic cable within a payload housing 340. In some embodiments, the payload housing 340 may generally have a U-shape, with a lower opening that can be positioned to extend around the powerline.

While operating in a fiber optic cable deployment mode, the robotic system 300 may be moved along a powerline by the drive subsystem 302. Simultaneously, the rotation subsystem 308 may rotate the payload subsystem 310. The fiber optic cable within the payload subsystem 310 may be deployed from the payload subsystem 310 and wrapped around the powerline. During operation in the fiber optic cable deployment mode, the stabilization subsystem 303 may maintain the robotic system 300 in a desired (e.g., upright) orientation.

While operating in an obstacle avoidance mode, the rotation subsystem 308 may stop rotating the payload subsystem 310 and the extension subsystem 306 may lift the payload subsystem 310 high enough to avoid contacting the obstacle. The stabilization subsystem 303 may be used to maintain the robotic system in a desired (e.g., upright) orientation. The drive subsystem 302 may be used to move the robotic system 300 past the obstacle, after which the extension subsystem 306 may lower the payload system 310 back into its initial position to deploy fiber optic cable. The rotation subsystem 308 may resume rotating the payload subsystem 310 about the powerline and the drive subsystem 302 may continue to drive the robotic system along the powerline.

The robotic system 300 may also include additional features and elements. For example, a power source (e.g., one or more batteries 342) may be included to provide power to the other subsystems to enable the robotic system 300 to operate. In some examples, as illustrated in FIG. 3, the batteries 342 may be positioned on battery rails 343 that extend downward (in the orientation shown in FIG. 3), such that the batteries 342 are below the powerline during at least some operations (e.g., during an obstacle avoidance maneuver). This configuration may improve a stability of the robotic system by lowering a center of gravity of the robotic system 300. In addition, the robotic system 300 may include one or more control elements, such as processors, controllers, communication interfaces (e.g., for wireless or wired communication), memory, etc.

In some examples, the robotic system 300 may include at least one controller 344 configured to control the actuators 326, 328 of the stabilization subsystem 303. For example, the controller(s) 344 may include at least one proportional-integral-derivative (PID) controller 344 operatively coupled to the actuators 326, 328 to operate the actuators 326, 328 at appropriate actuator speeds to maintain the robotic system 300 in a desired orientation (e.g., with a center of gravity laterally aligned with the powerline). The controllers 344 may receive feedback from one or more sensors, such as an inertial measurement unit (IMU) 346. The IMU 346 may include one or more accelerometers, gyroscopes, etc. configured to sense an orientation of the robotic system 300. As the IMU 346 senses that the robotic system 300 rolls or sways, the controllers 344 may operate the actuators 326 and/or 328 to apply a force against a frame of the robotic system 300 to re-orient the robotic system 300 to a desired (e.g., upright) orientation.

Figure 4:
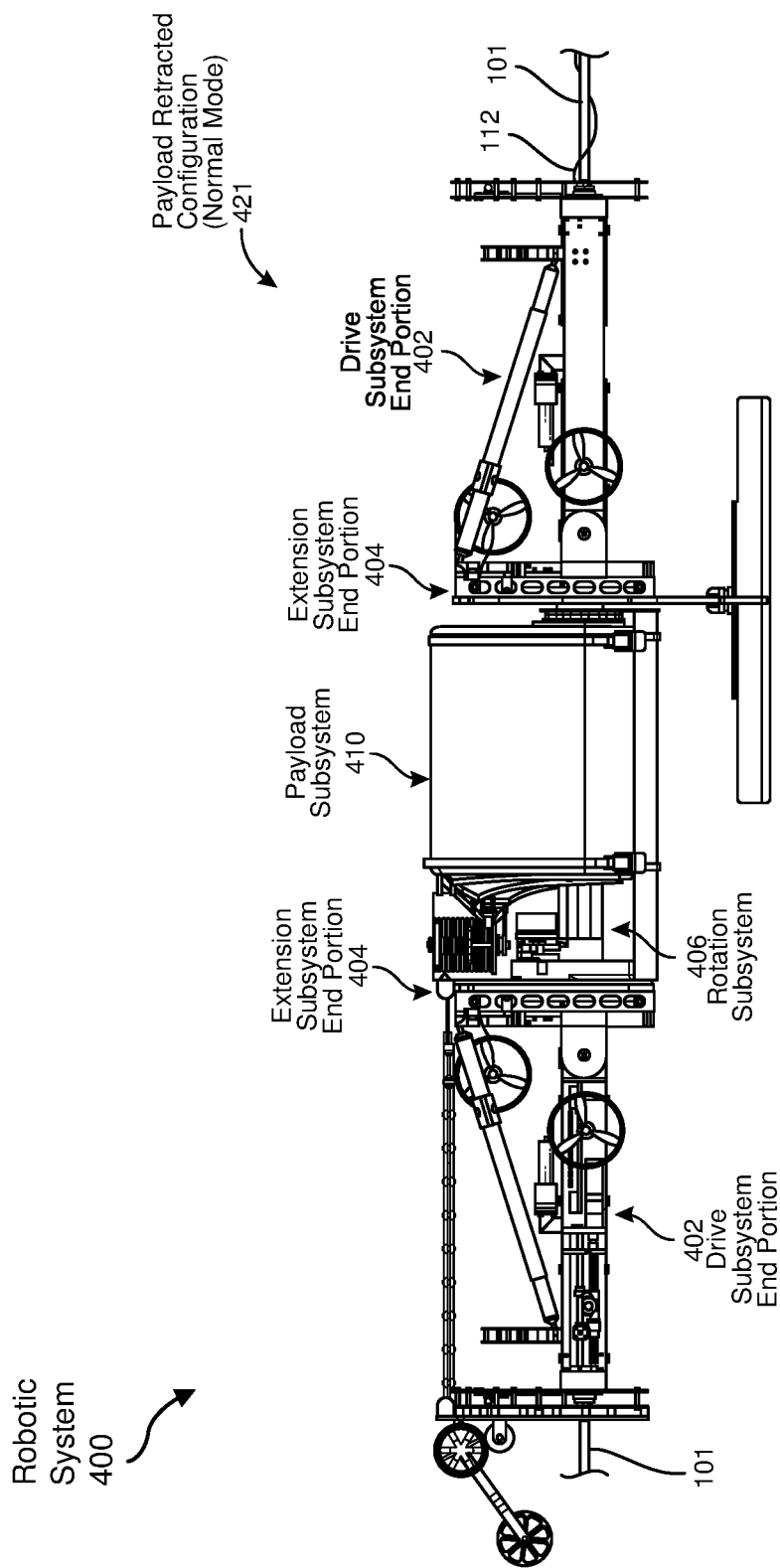
FIG. 4 is a side view of an example robotic system that may install a segment of fiber optic cable about a powerline, where the robotic system is in a payload retracted configuration (e.g., a normal operating mode), according to at least one embodiment of the present disclosure.
Figure 5:
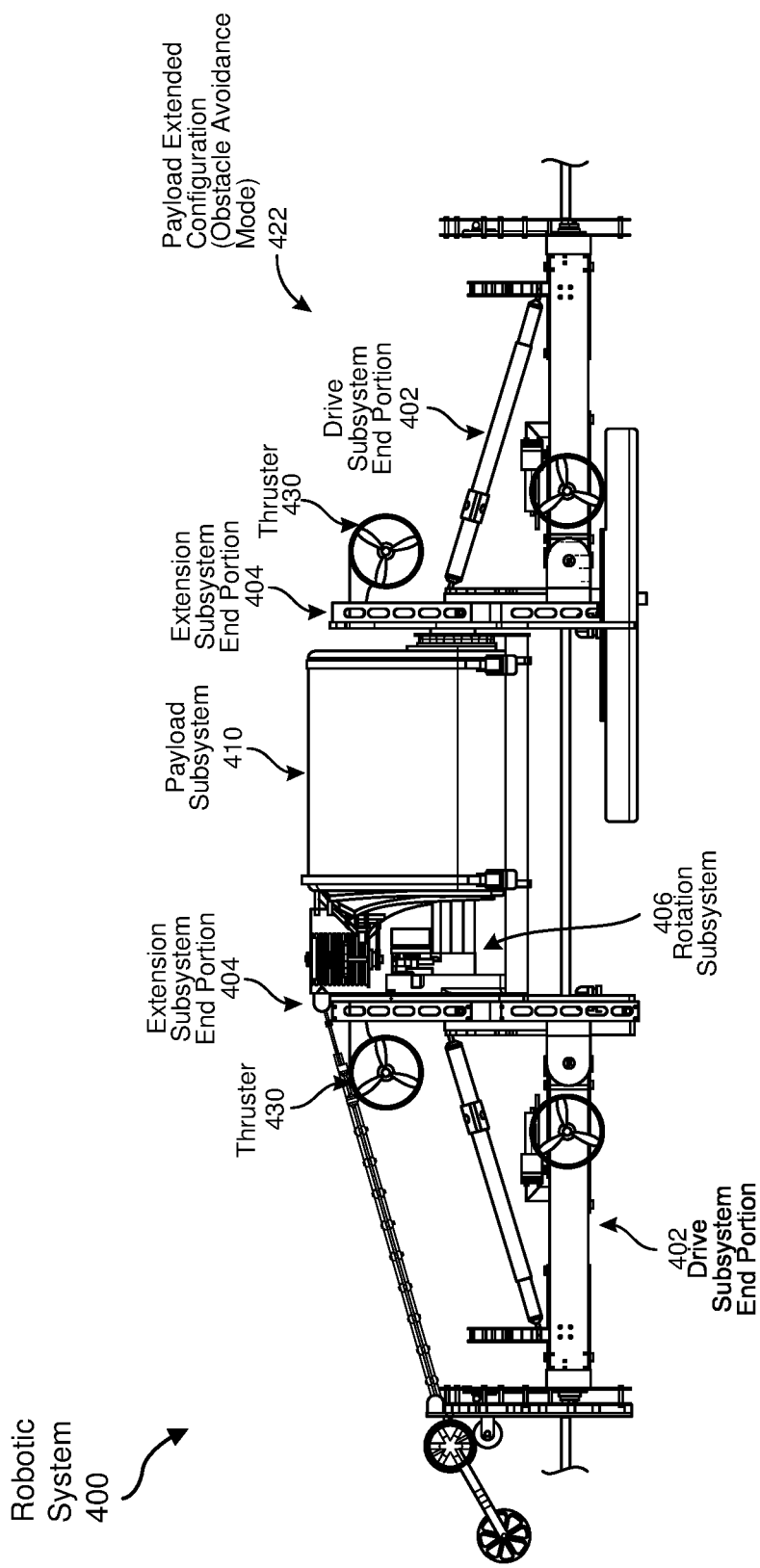
FIG. 5 is a side view of the robotic system of FIG. 4 with the payload subsystem in a payload extended configuration (e.g., an obstacle avoidance mode), according to at least one embodiment of the present disclosure.

FIGS. 4 and 5 are side views of associated configurations of an example robotic system 400, which may serve as an embodiment of the robotic system 200 of FIG. 2, as described above. As illustrated in FIGS. 4 and 5, the drive subsystem 202 may include separate drive subsystem end portions 402, and the extension subsystem 206 may include separate extension subsystem end portions 404 mechanically coupled to the corresponding drive subsystem end portions 402. In some embodiments, the robotic system 400 may include a first (e.g., leading or fore) end and a second (e.g., trailing or aft) end that may be determined by a direction in which the robotic system 400 translates along the powerline 101, with each end corresponding to a drive subsystem end portion 402 and an extension subsystem end portion 404. Additionally, a rotation subsystem 406 (e.g., serving as rotation subsystem 208 of FIG. 2), or some portion thereof, may be coupled at opposing ends to the extension subsystem end portions 404. Further, a payload subsystem 404 (e.g., serving as payload subsystem 210 of FIG. 2) carrying a segment of fiber optic cable 112 may be connected to, and held within, the rotation subsystem 306.

During normal operation (e.g., while not in an obstacle-avoidance scenario), the robotic system 400 may be in a payload retracted configuration 421, as depicted in FIG. 4, in which both of the drive subsystem end portions 402 are in a retracted (non-extended) position, and in which at least one drive subsystem end portion 402 may propel the robotic system 400 along the powerline 101 while the rotation subsystem 406 may rotate the payload subsystem 410 about its longitudinal axis that substantially aligns with the powerline 101 and while the payload subsystem 410 pays out a segment of fiber optic cable 112, resulting in the segment of the fiber optic cable 112 being helically wrapped about the powerline 101. In addition, in some examples, the extension subsystem end portions 404 may retain the rotation subsystem 406 in a retracted state so that the rotation subsystem 406 and the payload subsystem 410 remain close to the powerline 101, thus increasing the physical stability of the system while installing the fiber optic cable 112.

In some embodiments, each of the drive subsystem end portions 402 may be independently operated in a retracted state (e.g., as illustrated in FIG. 4) or an extended state (e.g., longitudinally along powerline 101 to facilitate obstacle avoidance by extending beyond an obstacle) and to selectively engage or release powerline 101 while bypassing an obstacle. Other examples may not include extendable or retractable versions of the drive subsystem end portions 402.

FIG. 5 is a side view of the robotic system 400 in a payload extended configuration 422 (e.g., an obstacle avoidance mode), in which the extension subsystem end portions 404 extend the payload subsystem 410 away (e.g., upward) from the drive subsystem end portions 402 and the powerline 101 as the drive subsystem end portions 402 translate the robotic system 400 along the powerline 101, thus allowing the rotation subsystem 406 (and, consequently, the payload subsystem 410) to pass over the obstacle. In addition, in some examples, the rotation subsystem 406 may include one or more stabilizing components (e.g., the upper actuators 430) to stabilize the orientation of the rotation subsystem 406, and thus the robotic system 400, such as by maintaining the current rotational position of the robotic system 400 relative to the powerline 101 (e.g., in the orientation illustrated in FIGS. 4 and 5). In some embodiments, the rotation subsystem 406 may provide stabilization only while the extension subsystem end portions 404 extend the rotation subsystem 406 upward or may provide such stabilization at other times as well.

In some embodiments, one or more components of the robotic system 400 that are primarily employed by the robotic system 400 for functions not directly associated with stabilization may be utilized to provide such stabilization. For example, components used for translation of the robotic system 400 along the powerline 101 (e.g., drive wheels and corresponding motors that clamp or otherwise engage the powerline 101 as part of the drive subsystem end portions 402) may be also configured to translate in a direction parallel to the ground and orthogonal to the powerline 101 relative to other portions of the robotic system 400, such as the extension subsystem end portions 404 and the rotation subsystem 406. In the payload extended configuration 422 and during an obstacle avoidance maneuver, the drive wheels may thus be located significantly below a center of gravity of the robotic system 400. Consequently, shifting the drive wheels horizontally in a direction toward which the payload subsystem 410 begins to tilt may counteract the tilt, resulting in a stabilization force being applied to the robotic system 400 to maintain the robotic system 400 in an upright orientation.

To successfully balance the robotic system 400 at least while in the payload extended configuration 422, a control method may be employed that utilizes one or more mathematical models representing the robotic system 400 and powerline 101. For example, the robotic system 400 may be modeled as an inverted pendulum balancing on a vibrating string (e.g., representing the powerline 101), thus obeying the wave equation. In some embodiments, the mathematical model may be created by joining a finite element method (FEM) model of a vibrating string with a rigid-object model of an inverted pendulum on a cart on the string. In some examples, these models may be joined to form a unified model by algebraically eliminating a shared constraint force from separate equations of motion (EOM). Further, in some embodiments, the rigid-object model for the robotic system 400 may include a model for one or more actuators (e.g., the actuators 430, gyroscopes, or the like) that may impose force on the robotic system 400 to stabilize robotic system (e.g., in an upright position over the powerline 101).

To facilitate obstacle avoidance, automatic detection and/or recognition of such obstacles is helpful. In some embodiments, as discussed above, the robotic system 400 may implement stereovision-based perception (e.g., using two or more cameras and/or other types of image sensors) to generate information regarding upcoming obstacles as the robotic system 300 travels along the powerline 101. Such information may include, but is not limited to, a distance to the obstacle, one or more dimensions of the obstacle, a spatial boundary of the obstacle, and an orientation of the obstacle relative to the robotic system 300. Further, in some examples, a control system of the robotic system 300 may determine and/or apply one or more obstacle avoidance strategies based on the generated information.

FIGS. 6-9 illustrate side perspective views of a robotic system 600 at various stages of performing an obstacle avoidance maneuver. In this example, the robotic system 600 moves along a powerline 650 with a drive subsystem 602 and encounters a utility pole 652 supporting the powerline 650 by an insulator 654. The insulator 654 is considered an obstacle that components (e.g., a payload subsystem 610) of the robotic system 600 should avoid.

Figure 6:
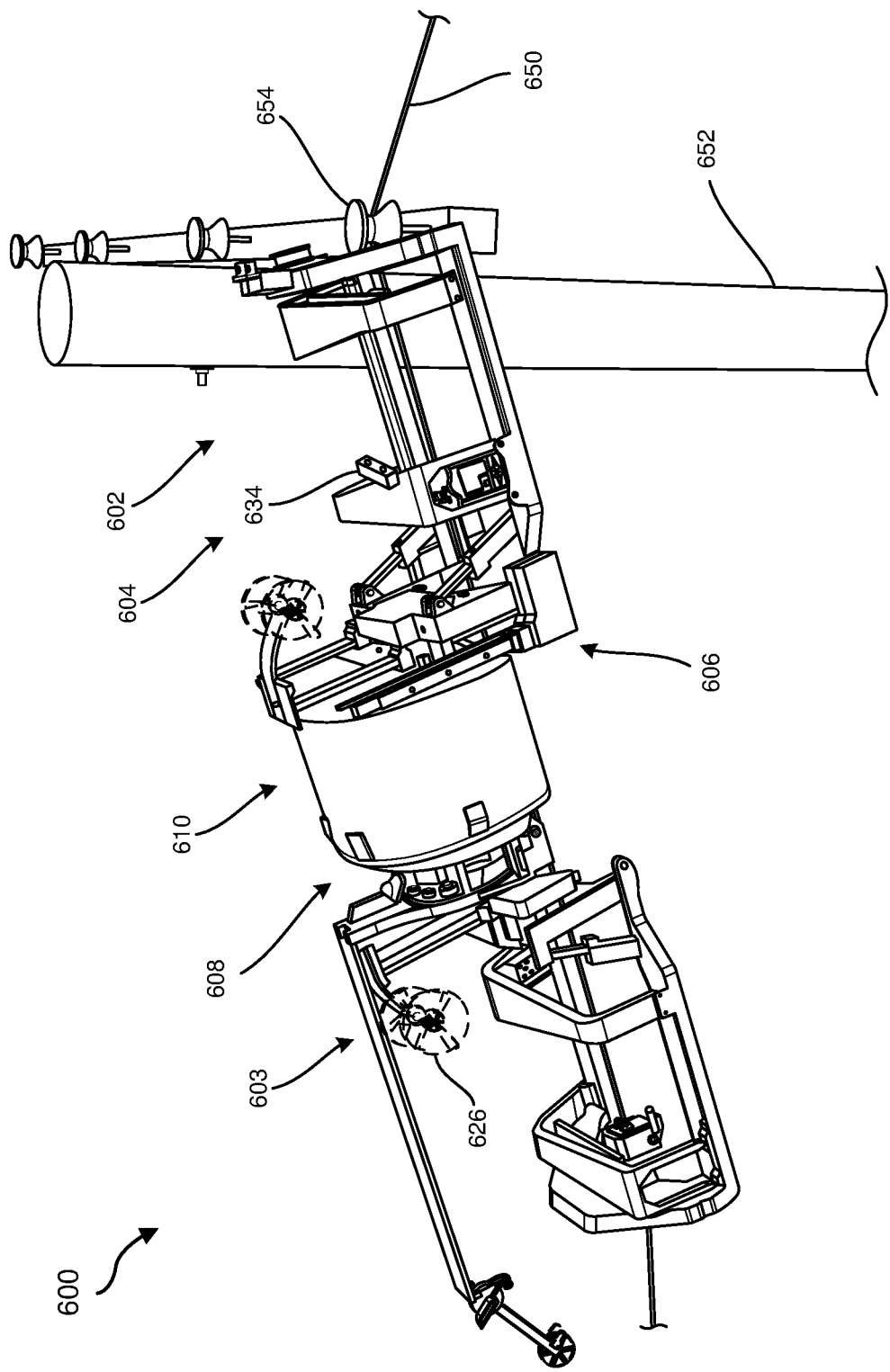
FIGS. 6-9 illustrate side perspective views of a robotic system at various stages of performing an obstacle avoidance maneuver, according to at least one embodiment of the present disclosure.

As shown in FIG. 6, as the robotic system 600 approaches the insulator 654, at least one camera 634 (e.g., a stereoscopic camera, a 2D camera, a combination thereof, etc.) may view the insulator 654. An obstacle detection subsystem 604, with a processor, may identify the insulator 654 as an obstacle to be avoided. A rotation subsystem 608 may stop rotating the payload subsystem 610 such that the payload subsystem 610 may be extended (e.g., raised) by an extension subsystem 606. The extension subsystem 606 may prepare for avoiding the obstacle by raising the payload subsystem 610 relative to other portions of the robotic system 600. A stabilization subsystem 603 may be activated (e.g., by controlling operation of actuators 626) to maintain the robotic system 600 in an upright position, even though a center of gravity of the robotic system 600 may be raised above the powerline 650 supporting the robotic system 600.

Figure 7:
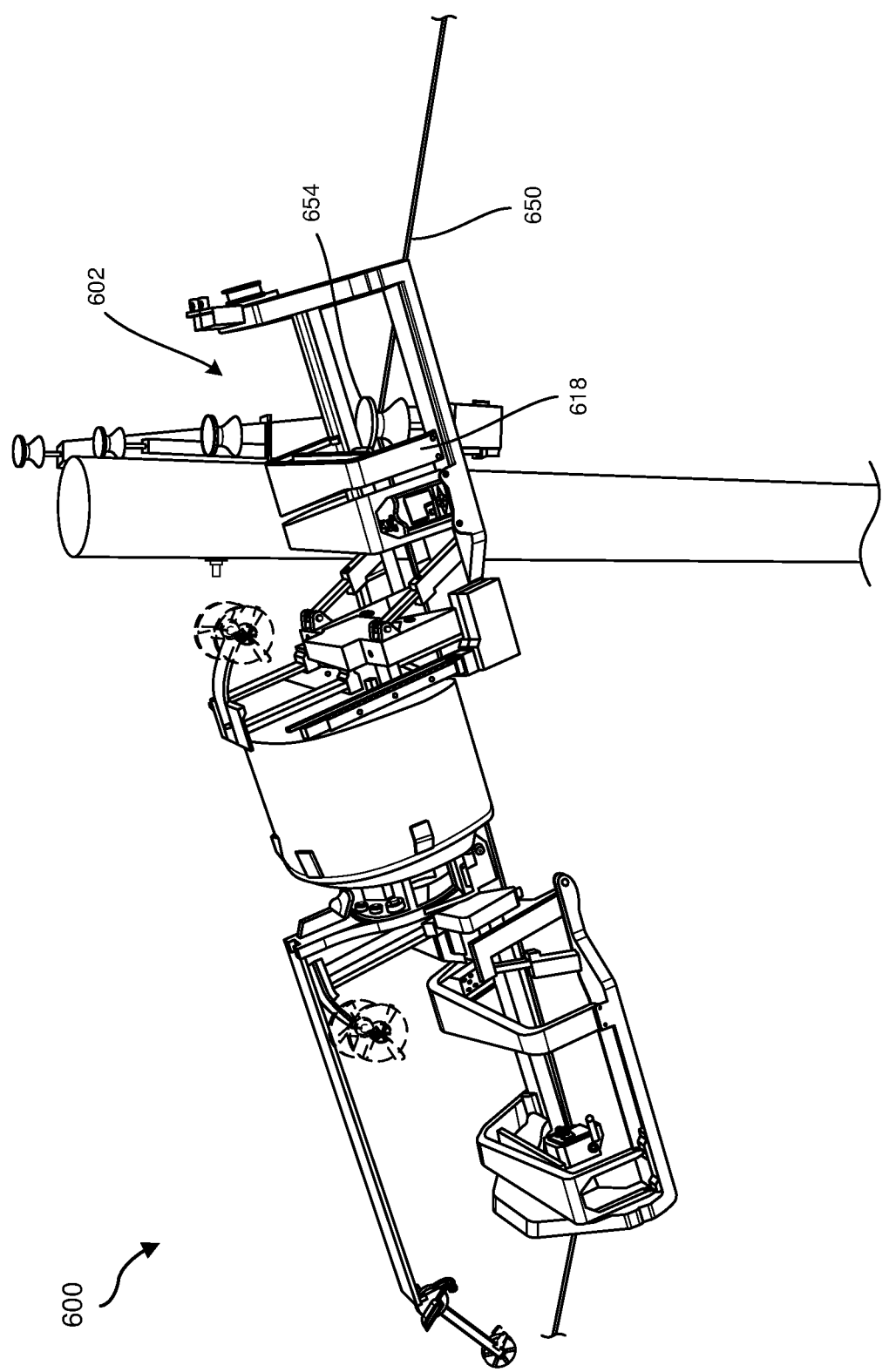

Referring to FIG. 7, the drive system 602 may continue to drive the robotic system 600 along the powerline. A roller frame element 618 at a front portion of the robotic system 600 may be moved backward (relative to other components of the robotic system 600) to maintain support of the robotic system 600 as the front portion extends over the insulator 654. A front gripper may then be caused to grip the powerline 650 to support the front portion of the robotic system 600.

Figure 8:
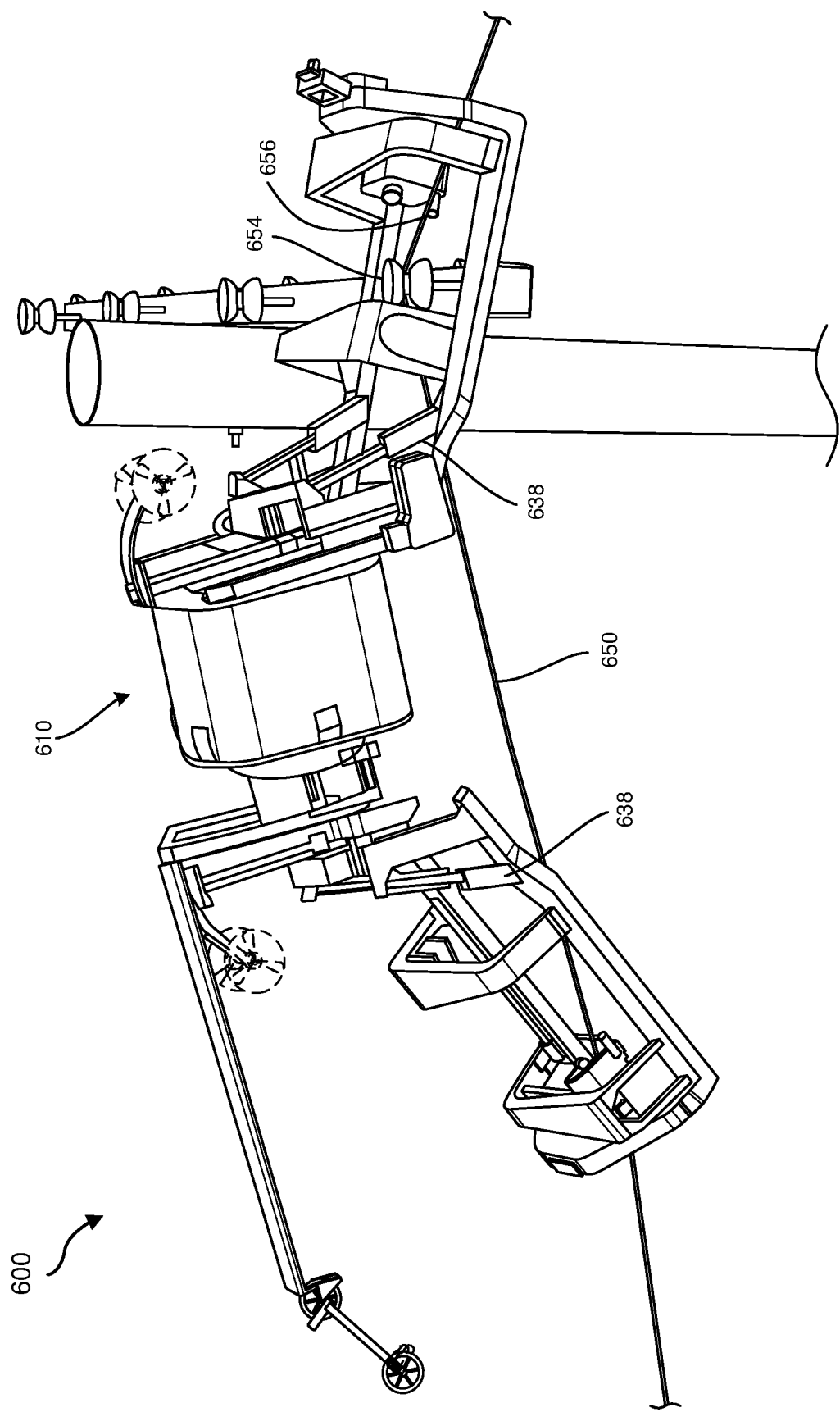

Referring to FIG. 8, front end and back end portions of a frame of the robotic system 600 may be rotated downward by end rotation actuators 638, causing the payload subsystem 610 to be raised further above the powerline 650. A front roller 656 may be disengaged from the powerline 650, and the roller frame element 618 at the front portion of the robotic system 600 may be moved forward past the insulator 654. The front roller 656 may be reengaged with the powerline 650 past the insulator 654, and the front gripper may release the powerline 650 behind the insulator 654.

Figure 9:
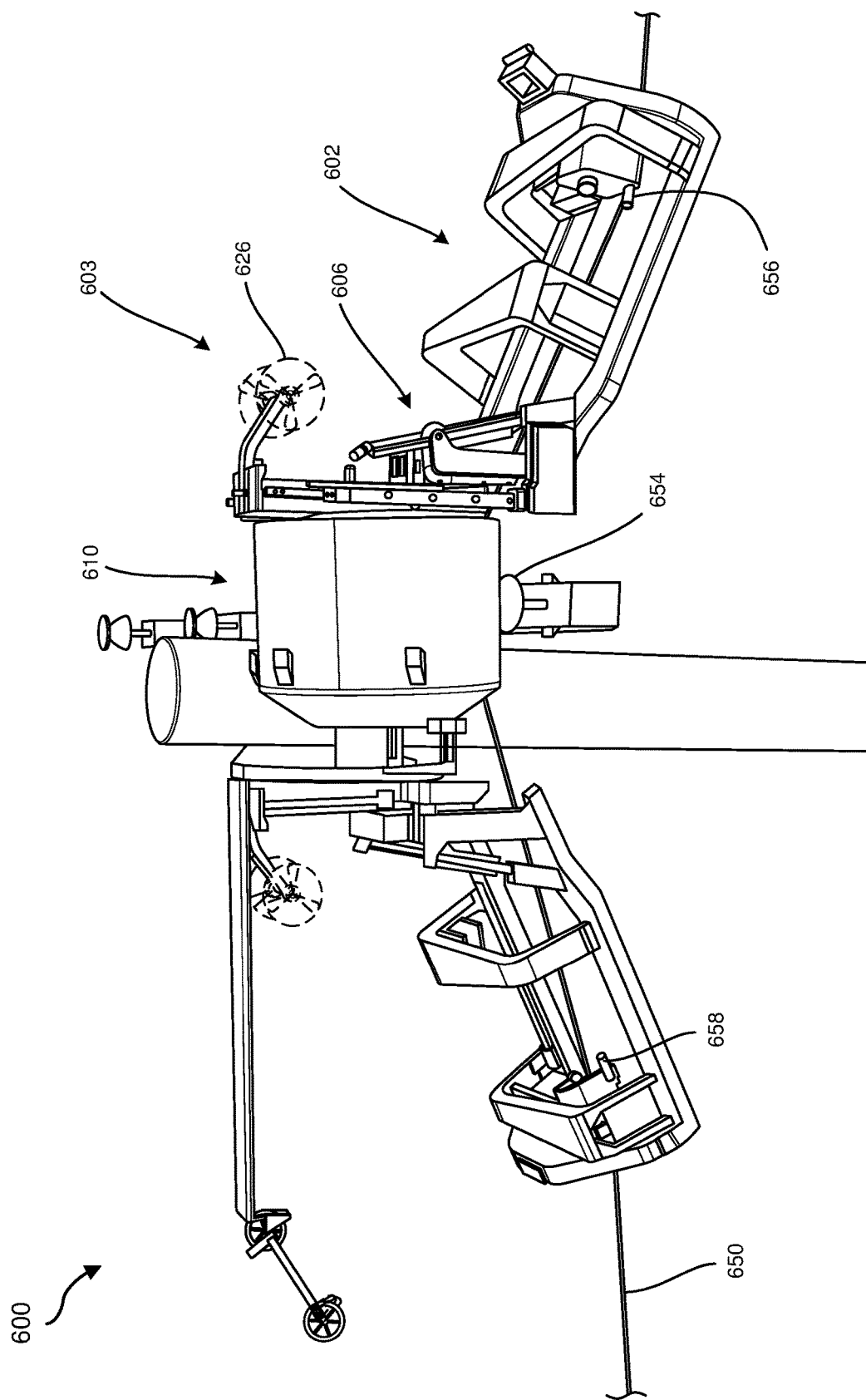

Referring to FIG. 9, the drive subsystem 602 may continue to move the robotic system 600 forward. The payload subsystem 610, raised by the extension subsystem 606, may pass over the insulator 654. The stabilization subsystem 603 may continue to stabilize the robotic system 600 to maintain an upright position, such as by controlled operation of the actuators 626.

Similar operations as were performed to move the front roller 656 past the insulator 654 may be used, in reverse, to move a rear roller 658 that supports the robotic system 600 on the powerline 650 past the insulator 654.

Figure 10:
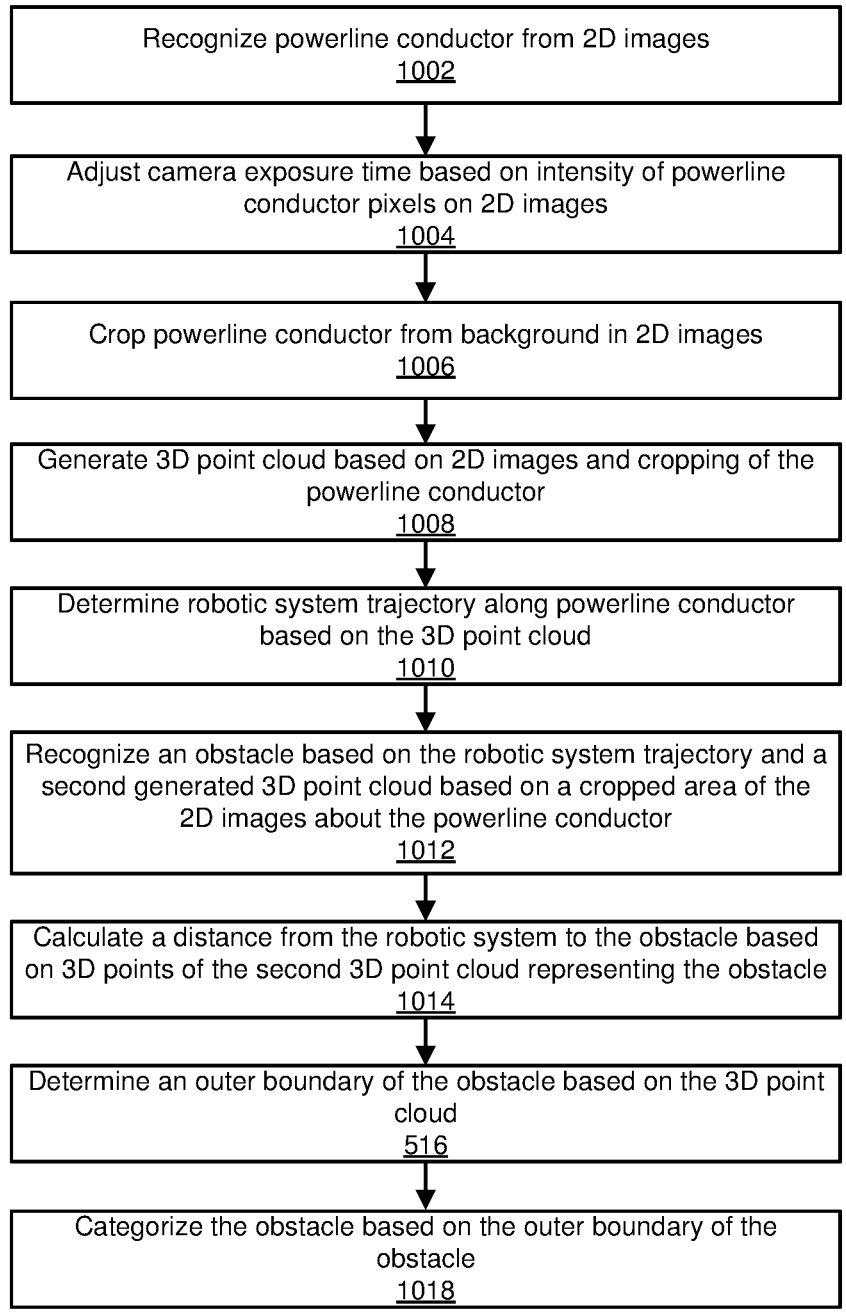
FIG. 10 is a flow diagram of an example method of obstacle detection, according to at least one embodiment of the present disclosure.

FIG. 10 is a flow diagram of an example method 1000 for obstacle recognition that may be performed by a robotic system. In the method 1000, at step 1002, the robotic system may recognize, in one or more two-dimensional (2D) images, a powerline upon which the robotic system is traveling. In some examples, a sequence of 2D images from each camera or sensor may be captured as the robotic system travels along the powerline. Further, each 2D image may constitute a plurality of picture elements (pixels), such as in a 2D (e.g., row and column) pattern. Also, in some examples, two cameras or other image sensors mounted on the robotic system may be employed to capture pairs of 2D images to provide three-dimensional (3D) information via stereoscopic effect.

In some embodiments, one or more unique visual features of the powerline may be employed for detection of the powerline, such as color (e.g., silvery or metallic for at least some powerlines), orientation (e.g., relative to the point of view of the camera(s)), notable surface features of the powerline, and/or substantially straight or linear appearance. Recognizing these visual features may facilitate the ability to filter out pixels of the 2D images that are not associated with the powerline.

For example, a silvery appearance may result in a significant brightness or intensity of a portion of the images representing the powerline. Also, in some embodiments, the orientation of the powerline relative to the cameras and the robotic system may be within some predetermined angular range, such as within a 60-degree or 120-degree span centered about a vertical orientation relative to the one or more cameras. Regarding notable features, in some examples, the powerline may have multiple individual wires or "threads" formed in a spiral wrap configuration (e.g., individual wires of an aluminum-conductor steel-reinforced (ACSR) cable serving as the powerline) that may be distinguishable from other portions of the images. Moreover, in some embodiments, the powerline, over a short distance (e.g., ten feet) within the robotic system, may appear substantially straight. Consequently, in some examples, the powerline may be detected in the 2D images using a straight-line detection method (e.g., the Hough transform). Consequently, in some embodiments, the pixels corresponding to the powerline in the 2D images may be designated or labeled as such for use in recognizing an obstacle along the powerline, as discussed below.

At step 1004, the robotic system may adjust an exposure time associated with the 2D images captured by the one or more cameras based on an intensity of pixels representing the powerline in the 2D images. More specifically, as the exposure time often determines the brightness and/or intensity of the images, some exposure times may be more conducive than others for detecting obstacles. For example, while default exposure times may be set based on a time of day (e.g., 600 microseconds (usec) in the morning and afternoon, compared to 200 μsec at around noon) to facilitate a basic level of obstacle detection capability, more precise control of exposure time may enhance that capability. In some embodiments, an exposure time for a current 2D image may be based on an intensity of one or more pixels of the recognized powerline (e.g., an average intensity of multiple pixels of the powerline) of one or more prior 2D images.

Further, at step 1006, using the pixels of 2D images that are labeled as the powerline, at least a portion of the powerline may be outlined (e.g., by way of a quadrilateral boundary defined by four points at corresponding corners) in the 2D images. Further, in some embodiments, for each stereoscopic pair of 2D images, a union area defined by the quadrilateral boundary of each of the pair of 2D images may be employed to crop the powerline from both images.

At step 1008, a 3D point cloud may be generated for the powerline (e.g., using a stereovision algorithm that detects corresponding features within the 2D images and takes into account a relative position of the cameras capturing the images) based on the pairs of 2D images and the cropped portions thereof. In some embodiments, the 3D point cloud may be depth-variant by way of adjusting the resolution of a plurality of sections of the powerline such that a lower resolution may be associated with sections of the powerline that are closer to the robotic system because objects and surfaces that are closer to the cameras carried on the robotic system consume a larger area of the 2D images, possibly making the resolution of such objects and surfaces unnecessarily high. In some embodiments, the portion of the powerline appearing in the 2D images may be divided into a plurality of zones (e.g., a "close" zone, a "medium" zone, and a "far" zone), with the resolution of the pixels of each zone being resized (e.g., by a factor of 0.5, 0.7, and 1.0, respectively) so that the resolution of the zones closer to the robotic system is reduced, possibly resulting in reduced computation time for 3D reconstruction without sacrificing accuracy. To facilitate the depth-variant nature of the resulting 3D cloud, the cameras employed may be high-resolution cameras with narrow field-of-view (FOV) lenses to generate more pixels for objects and surfaces that are farther from the cameras.

At step 1010, based on the generated 3D point cloud for the powerline, a path or trajectory of the robotic system along the powerline may be determined. For example, presuming that the powerline defines a straight line within a close distance of the robotic system, the 3D coordinates for the powerline may be fitted to that straight line to define the path along which the robotic system will travel.

Further, at step 1012, the quadrilateral boundary for the powerline described above may be employed to crop the original 2D images again, this time to include a potential obstacle that may be located along that portion of the powerline. In some examples, the quadrilateral boundary may be expanded by some factor or percentage (e.g., 20 percent) to help ensure that any obstacle that may exist along that portion of the powerline will be included in the newly cropped images. Based on those newly cropped images, in some embodiments, a second 3D point cloud may be generated (e.g., using the stereovision algorithm mentioned above). In some examples, this second 3D point cloud may be divided into a number of layers (termed "z-layers") along a direction of travel for the robotic system defined by the powerline, and an obstacle identification algorithm may be employed to search through each z-layer to detect objects or surfaces associated with an obstacle within the newly cropped images along the robotic system trajectory determined above.

More specifically, in some embodiments, at each z-layer, the robotic system trajectory may be taken as an origin, with all points of the second 3D point cloud beyond some predetermined distance of the origin (e.g., an outer envelope for the robotic system) being removed or ignored. The remaining points of the second 3D point cloud may then be filtered (e.g. via one or more filter algorithms) to reduce noise and/or statistical outliers to increase the accuracy of the location, size, and shape of the potential obstacle, as defined by the filtered 3D points (e.g., by way of any deviation of the 3D points from an expected size and shape of the powerline). In some embodiments, in each z-layer, an obstacle may be detected by comparing the area defined by the point cloud in that z-layer to a cross-sectional area of the powerline such that if the area defined by the point cloud is greater than the cross-sectional area of the powerline, a determination may be made that at least some points of the point cloud of that z-layer are located at a greater radius than that of the powerline, possibly indicating that an obstacle is present at that z-layer.

At step 1014, based on the 3D points associated with the obstacle, a distance from the robotic system to the obstacle may be calculated. In some examples, the distance may be defined as the distance between a front (e.g., leading) edge of the robotic system and a nearest surface of the obstacle. This distance may be used to determine where and when the robotic system may initiate an obstacle avoidance maneuver, as discussed above.

Thereafter, at step 1016, the 3D points representing the obstacle may be employed to determine or generate an outer boundary of the obstacle. In some embodiments, the 3D points of the obstacle at each z-layer may be converted to a radiant coordinate frame in that layer. More specifically, in some examples, at each z-layer, a scan covering 360 degrees about the origin perpendicular to the z-layer (e.g., defined by the path of the robotic system) may be performed at 5-degree increments to select a maximum radius of the obstacle from the origin at that increment. Further, in some embodiments, the boundary at each z-layer may be interpolated between those increments (e.g., at 1-degree increments). After scanning each z-layer, the boundary data for the z-layers may be "stacked" or combined to generate an overall outer boundary for the obstacle. Thereafter, in some examples, interpolation between z-layers may then be performed (e.g., with a resolution of 0.01 meters (m)), resulting in a complete outer boundary in three dimensions for the obstacle. In yet other embodiments, inertial measurement unit (IMU) data may also be utilized to determine an orientation of the obstacle boundary to a predetermined coordinate frame (e.g., an earth-based coordinate frame).

At step 1018, based on the outer boundary of the obstacle, the obstacle may be categorized in terms of a possible response by the robotic system in avoiding the obstacle. For example, the obstacle may be placed into one of three categories: (1) obstacles that may be avoided without extending a payload subsystem from the powerline (e.g., armor rods, tie wraps, powerline splices, and spiral vibration dampers); (2) obstacles that may only be avoided with extension of the payload subsystem from the powerline (e.g., insulators, taps, and bird diverters); and obstacles that the robotic system cannot avoid without human intervention. Based on such categorization, the robotic system may then avoid the obstacle (if possible) based on the category in which the obstacle has been placed, as described above.

Figure 11:
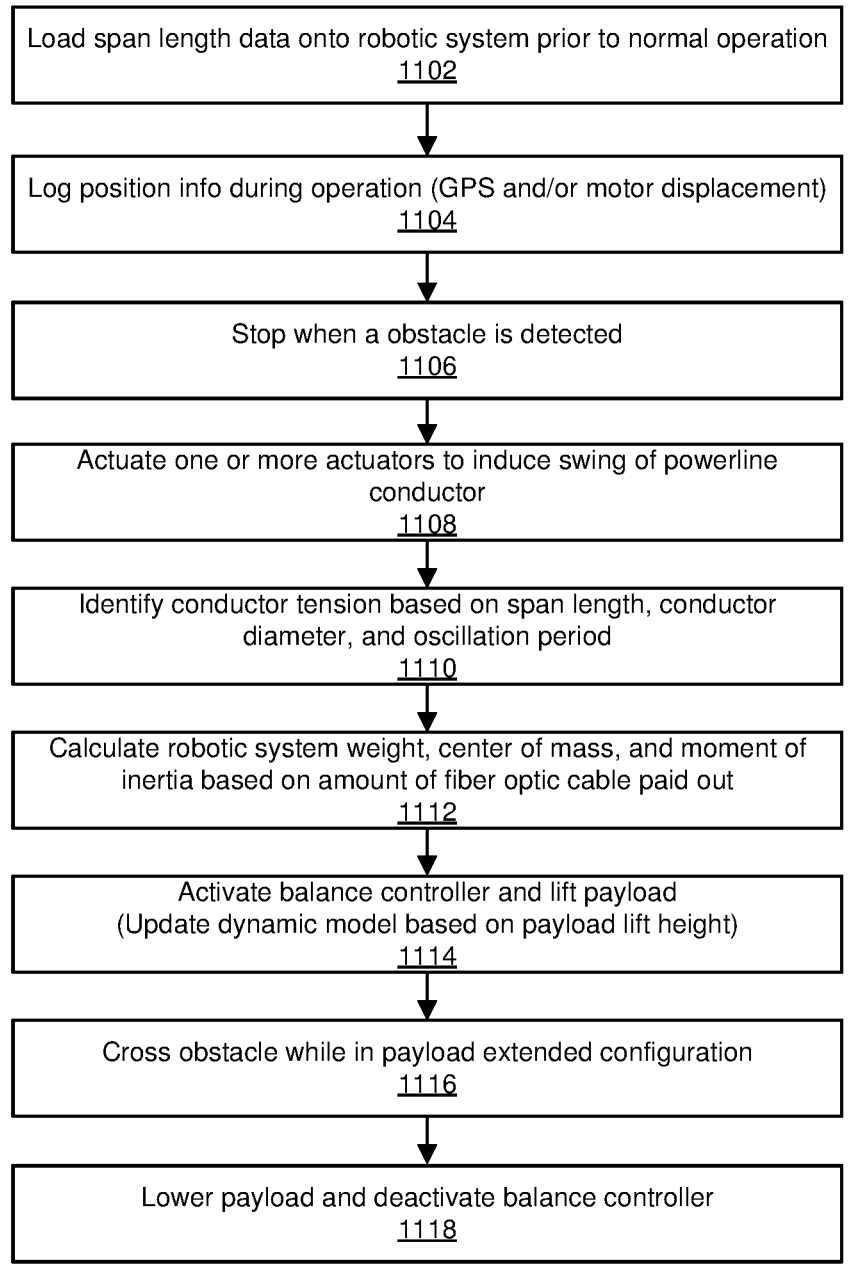
FIG. 11 is a flow diagram of an example method of obstacle avoidance, according to at least one embodiment of the present disclosure.

FIG. 11 is a flow diagram of an example method 1100 for obstacle avoidance that may be performed by a robotic system as discussed above. In the method 1100, at step 1102, span length data regarding one or more spans of the powerline over which the robotic system is to travel may be loaded onto the robotic system prior to normal operation (e.g., helical wrapping of the fiber optic cable onto the powerline). Moreover, at step 1104, during normal operation, the robotic system may log position information (e.g., GPS information, displacement information based on rotation of motors that cause the robotic system to travel along the powerline, and the like).

At step 1106, the robotic system may stop when an obstacle along the powerline (e.g., an insulator, a tap, a change in direction at the utility pole, and so on) is detected. Further, at step 1108, one or more actuators (e.g., thrusters, gyroscopes, or the like) may be actuated to intentionally induce a swing of the powerline (e.g., at the fundamental frequency of the span). At step 1110, a tension of the powerline may be identified or calculated based on an oscillation period of the powerline of the swing induced by the one or more actuators, as well as the length of the span and the diameter of the powerline, possibly in addition to other parameters describing the powerline. In addition, at step 1112, the current weight, center of mass, and moment of inertia of the robotic system may be calculated based on an amount of the fiber optic cable remaining in the payload subsystem, which in turn is based on the amount of the fiber optic cable that has been paid out (e.g., wrapped) onto the powerline from the current segment of the fiber optic cable carried in the payload subsystem.

At step 1114, a balance controller may be activated and the payload subsystem may be raised upward into a payload extended configuration in anticipation of crossing the detected obstacle. Further, the operation of the balance controller may be based on a dynamic model that may be updated based on at least one of the various measured or calculated parameters. At step 1116, the obstacle may be crossed while the robotic system remains in the payload extended configuration. After the obstacle has been passed, at step 1118, the robotic system may lower the payload subsystem back to the payload retracted configuration and may deactivate the balance controller.

Figure 12:
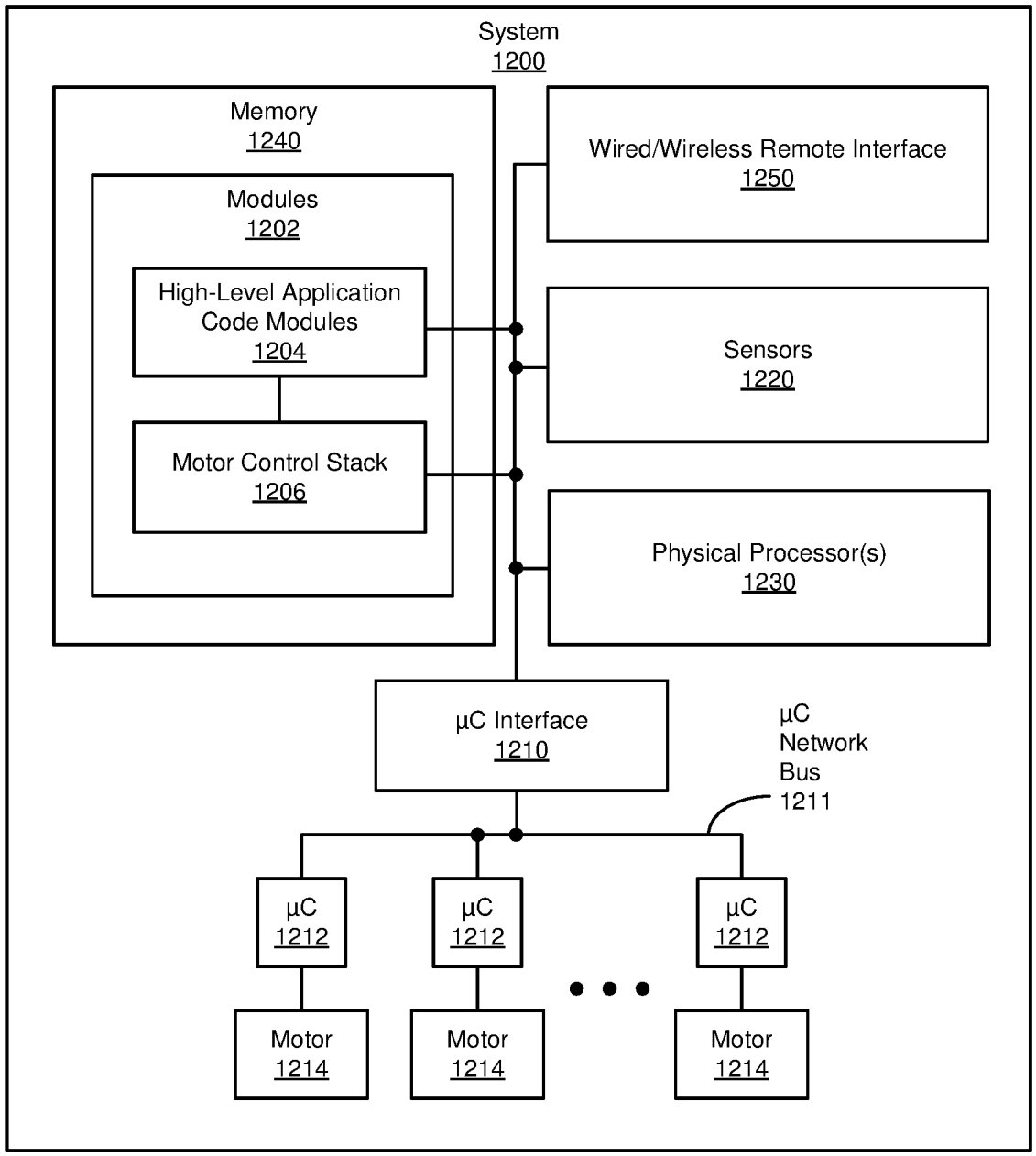
FIG. 12 is a block diagram of an example robotic system for installing a fiber optic cable on a powerline, according to at least one embodiment of the present disclosure.
Figure 13:
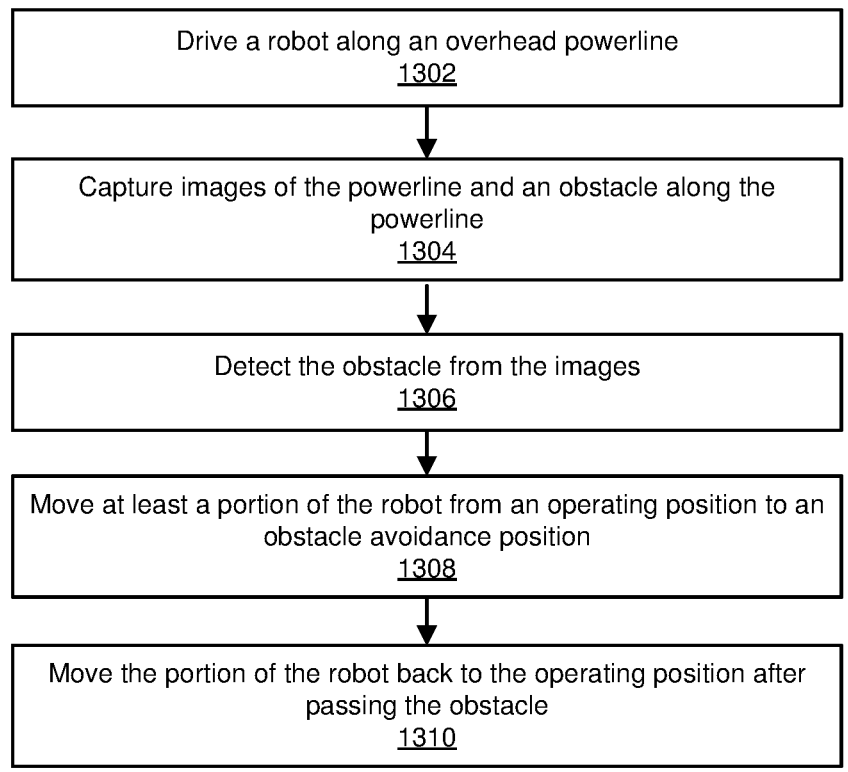
FIG. 13 is a flow diagram of an example method of obstacle avoidance, according to at least one other embodiment of the present disclosure.

FIG. 12 is a block diagram of an example system 1200 (e.g., serving as the robotic system 200, 300, and/or 400) for installing fiber optic cable 112 onto the powerline 101. As depicted in FIG. 12, the system 1200 may include a memory 1240 storing various modules 1202 executable by one or more physical processors 1230 for causing or controlling various operations of the system 1200. In some embodiments, the modules 1202 may include high-level application code modules 1204 that perform high-level tasks that may include, but are not limited to, initialization and/or calibration of various portions of the system 1200; motion management for various subsystems (e.g., the drive subsystem end portions 402, the extension subsystem end portions 404, the rotation subsystem 406, and/or the payload subsystem 410) to initiate and monitor various operations (e.g., translation along the powerline 101, rotation of the payload subsystem 410 by the rotation subsystem 406 for installing the fiber optic cable 112, obstacle avoidance (including recognition of obstacles along the powerline 101), the system 1200 loading and unloading, and so on; command and message logging; reception and interpretation of sensor signals (e.g., from sensors 1220); communication with an operator or an external control system (e.g., by way of a wired/wireless remote interface 1250); and the like.

Further, in some examples, motion management and related motion functions may be performed by way of a motor control stack 1206 that communicates with various motors 1214 of the system 1200 to perform the various motion operations noted above. In some embodiments, the modules 1202 may be received (e.g., via the wired/wireless remote interface 1250) and installed by way of software container technology. Also, in some examples, the modules 1202 may employ a software framework and related messaging scheme tailored for robotic applications (e.g., the Robot Operating System (ROS) framework).

In some embodiments, the wired/wireless remote interface 1250 may include communication circuitry (e.g., a wired or wireless transceiver) to facilitate reception of commands (e.g., from a human operator, etc.) to control various portions of the system 800, as mentioned above, as well as to enable the return of status or logging information.

The sensors 1220 may include one or more sensors (e.g., proximity sensors, IMU sensors, limit switches, optical encoders, cameras, etc.) for detecting obstacles; for detecting a current position, orientation, or motion of the system 1200 or its various components; and so on. The information provided by the sensors 1220 may be employed by the modules 1202 or firmware executed by microcontrollers on the system 1200 to perform their corresponding tasks.

In some embodiments, each motor 1214 of the system 1200 may have a corresponding microcontroller 1212 and associated (e.g., integrated) memory containing firmware that, when executed by the microcontroller 1212, controls the operation of that motor 1214. Further, in some examples, the motor control stack 1206 may issue commands and receive status information from the microcontrollers 1212 by way of a microcontroller interface 1210 coupled to a microcontroller network bus 1211 to which the microcontrollers 1212 are communicatively coupled. In some embodiments, the microcontroller network bus 1211 may be a Controller Area Network (CAN) bus, although other types of buses or interfaces may be employed in other examples.

FIG. 13 is a flow diagram of another example method 1300 of obstacle avoidance. At step 1302, a robot may be driven along an overhead powerline. Step 1302 may be performed in a variety of ways. For example, the robot may be driven with a drive subsystem, as described above.

At step 1304, images of the powerline and an obstacle along the powerline may be captured with at least one camera. Step 1304 may be performed in a variety of ways. For example, at least one infrared camera may capture infrared images of the powerline and the obstacle along the powerline. In another example, a stereoscopic camera that has at least two distinct image capture devices may be used to capture the images of the powerline and the obstacle along the powerline.

At step 1306, at least one processor may detect the obstacle from the images. Step 1306 may be performed in a variety of ways. For example, the obstacle may be identified by the processor using techniques as described above with reference to FIG. 10.

At step 1308, an extension mechanism may move at least a portion of the robot from an operating position (e.g., a position to deploy fiber optic cable along the powerline) to an obstacle avoidance position away from the obstacle as the robot is driven along the powerline to avoid the obstacle. Step 1308 may be performed in a variety of ways. For example, a payload subsystem of the robot may be lifted as described above with reference to FIGS. 6-9.

At step 1310, the extension mechanism may move the portion of the robot back to the operating position after passing the obstacle. Step 1310 may be performed in a variety of ways. For example, the payload subsystem may be moved back into the operating position as described above with reference to FIG. 9.

As discussed above in conjunction with FIGS. 1-13, robotic systems and methods described herein may facilitate automatic or semiautomatic installation of significant lengths of fiber optic cable onto a powerline (e.g., by helical wrapping) while avoiding one or more obstacles (e.g., insulators, taps, and/or the like) along the powerline, such that normal installation operation of the system may continue after the avoidance maneuver without significant human intervention. Such capabilities may result in accelerated and reliable installation of fiber optic cable in underserved geographical areas by way of preexisting power transmission and/or distribution infrastructure. Consequently, such systems and methods may facilitate a substantial reduction in make ready costs for providing fiber optic cable in such a manner over conventional installation systems.

The following example embodiments are also included in the present disclosure.

Example 1: A system for suspending cable from an overhead powerline, which may include: a payload subsystem for housing and dispensing a cable along an overhead powerline; a rotation subsystem for winding the cable from the payload subsystem around the powerline; an extension subsystem for moving the payload subsystem to avoid obstacles; an obstacle detection subsystem for automatically detecting obstacles encountered along the powerline to be avoided with the extension subsystem; a drive subsystem for driving the system along the powerline; and at least one processor for controlling the payload subsystem, rotation subsystem, extension subsystem, obstacle detection subsystem, and drive subsystem in a manner that avoids obstacles as the system moves along the powerline.

Example 2: The system of Example 1, wherein the obstacle detection subsystem comprises at least one camera positioned on a frame of the system.

Example 3: The system of Example 2, wherein the at least one camera comprises at least one stereoscopic camera including at least two distinct image capture devices.

Example 4: The system of Example 3, wherein the at least one camera is configured to capture image data for detecting a distance of obstacles from the at least one camera.

Example 5: The system of any of Examples 2 through 4, wherein the at least one camera comprises at least one infrared image sensor, wherein the obstacle detection system further comprises an infrared light emitter.

Example 6: The system of any of Examples 2 through 5, wherein the drive subsystem comprises a gripper mounted on a gripper frame, the gripper configured to grip the powerline, wherein the at least one camera is mounted on the gripper frame.

Example 7: The system of Example 6, wherein the at least one camera is directed to capture an image of the powerline from a lateral side of the powerline.

Example 8: The system of any of Examples 2 through 7, wherein the at least one camera comprises: a depth-sensing camera including at least two image capture devices; and a two-dimensional camera.

Example 9: The system of any of Examples 1 through 8, wherein the obstacle detection subsystem comprises a processor configured to identify, based on data from at least one sensor, the powerline and an obstacle touching or adjacent to the powerline.

Example 10: The system of any of Examples 1 through 9, wherein the obstacles detected by the obstacle detection subsystem comprise at least one of the following: a support pole; a tap clamp; an insulator support; a bird diverter; a Stockbridge damper; a spiral vibration damper; a tie wrap; or a splice.

Example 11: The system of any of Examples 1 through 10, wherein the drive subsystem comprises a motion subsystem configured to sense a distance that the system is driven along the powerline by the drive subsystem.

Example 12: The system of any of Examples 1 through 11, wherein the extension subsystem is configured to raise the payload system upward relative to the powerline to avoid the obstacles.

Example 13: The system of Example 12, further comprising a stabilization subsystem configured to stabilize the system on the powerline at least when the payload system is raised upward relative to the powerline.

Example 14: An obstacle avoidance mechanism, which may include: at least one camera positioned on a frame of a powerline-crawling robot, the at least one camera positioned and configured to capture images of the powerline and obstacles along the powerline; at least one processor configured to process the captured images from the at least one camera to identify the obstacles and a location of the obstacles; and an extension actuator configured to lift a payload of the powerline-crawling robot to avoid the identified obstacles.

Example 15: The obstacle avoidance mechanism of Example 14, wherein the at least one camera comprises a stereoscopic camera with at least two distinct image capture devices.

Example 16: The obstacle avoidance mechanism of Example 15, wherein the at least two distinct image capture devices comprise a first infrared image capture device and a second infrared image capture device configured and positioned to detect infrared light emitted by or reflected from the obstacles.

Example 17: The obstacle avoidance mechanism of any of Examples 14 through 16, wherein the at least one camera comprises a plurality of cameras positioned at different respective locations on the frame of the powerline-crawling robot.

Example 18: A method of avoiding obstacles, which method may include: driving a robot along an overhead powerline; capturing, with at least one camera, images of the powerline and an obstacle along the powerline; detecting, with at least one processor, the obstacle from the images; moving, with an extension mechanism, at least a portion of the robot from an operating position to an obstacle avoidance position away from the obstacle as the robot is driven along the powerline to avoid the obstacle; and moving, with the extension mechanism, the portion of the robot back to the operating position after passing the obstacle.

Example 19: The method of Example 18, wherein capturing, with the at least one camera, images of the powerline and the obstacle along the powerline comprises capturing, with at least one infrared camera, infrared images of the powerline and the obstacle along the powerline.

Example 20: The method of Example 18 or 19, wherein capturing, with the at least one camera, images of the powerline and the obstacle along the powerline comprises capturing, with at least one stereoscopic camera having at least two distinct image capture devices, the images of the powerline and the obstacle along the powerline.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system for suspending cable from an overhead powerline, the system comprising:
    a payload subsystem for housing and dispensing a cable along an overhead powerline;
    a rotation subsystem for winding the cable from the payload subsystem around the powerline;
    an extension subsystem for moving the payload subsystem to avoid obstacles;
    an obstacle detection subsystem for automatically detecting obstacles encountered along the powerline to be avoided with the extension subsystem;
    a drive subsystem for driving the system along the powerline; and
    at least one processor for controlling the payload subsystem, rotation subsystem, extension subsystem, obstacle detection subsystem, and drive subsystem in a manner that avoids obstacles as the system moves along the powerline.

2. The system of claim 1, wherein the obstacle detection subsystem comprises at least one camera positioned on a frame of the system.

3. The system of claim 2, wherein the at least one camera comprises at least one stereoscopic camera including at least two distinct image capture devices.

4. The system of claim 3, wherein the at least one camera is configured to capture image data for detecting a distance of obstacles from the at least one camera.

5. The system of claim 2, wherein the at least one camera comprises at least one infrared image sensor, wherein the obstacle detection subsystem further comprises an infrared light emitter.

6. The system of claim 2, wherein the drive subsystem comprises a gripper mounted on a gripper frame, the gripper configured to grip the powerline, wherein the at least one camera is mounted on the gripper frame.

7. The system of claim 6, wherein the at least one camera is directed to capture an image of the powerline from a lateral side of the powerline.

8. The system of claim 2, wherein the at least one camera comprises:
    a depth-sensing camera including at least two image capture devices; and
    a two-dimensional camera.

9. The system of claim 1, wherein the obstacle detection subsystem comprises a processor configured to identify, based on data from at least one sensor, the powerline and an obstacle touching or adjacent to the powerline.

10. The system of claim 1, wherein the obstacles detected by the obstacle detection subsystem comprise at least one of the following:
    a support pole;
    a tap clamp;
    an insulator support;
    a bird diverter;
    a Stockbridge damper;
    a spiral vibration damper;
    a tie wrap; or
    a splice.

11. The system of claim 1, wherein the extension subsystem is configured to raise the payload subsystem upward relative to the powerline to avoid the obstacles.

12. The system of claim 11, further comprising a stabilization subsystem configured to stabilize the system on the powerline at least when the payload subsystem is raised upward relative to the powerline.

* * * * *